US012428978B2

(12) United States Patent
Muth-Seng et al.

(10) Patent No.: US 12,428,978 B2
(45) Date of Patent: Sep. 30, 2025

(54) EQUIPMENT FOR TREATING AN AIRCRAFT TURBOMACHINE COMPONENT

(71) Applicant: SAFRAN AIRCRAFT ENGINES, Paris (FR)

(72) Inventors: Christelle Muth-Seng, Moissy-Cramayel (FR); William Duarte, Moissy-Cramayel (FR); Guillaume Gava, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/560,212

(22) PCT Filed: May 9, 2022

(86) PCT No.: PCT/FR2022/050876
§ 371 (c)(1),
(2) Date: Nov. 10, 2023

(87) PCT Pub. No.: WO2022/243619
PCT Pub. Date: Nov. 24, 2022

(65) Prior Publication Data
US 2024/0240574 A1   Jul. 18, 2024

(30) Foreign Application Priority Data
May 19, 2021   (FR) ........................................ 2105224

(51) Int. Cl.
*F01D 25/28*   (2006.01)
*B23P 6/00*   (2006.01)
(Continued)

(52) U.S. Cl.
CPC ............ *F01D 25/285* (2013.01); *B23P 6/007* (2013.01); *B24C 1/04* (2013.01); *C23C 4/01* (2016.01);
(Continued)

(58) Field of Classification Search
CPC ........ F01D 25/28; F01D 25/285; F01D 5/005; F05D 2240/90; F05D 2240/91
See application file for complete search history.

(56) References Cited

U.S. PATENT DOCUMENTS

| 2004/0106359 | A1* | 6/2004 | Pan ......................... B24C 3/327 451/36 |
| 2015/0231665 | A1 | 8/2015 | Strock et al. |
| 2017/0361422 | A1 | 12/2017 | Brand et al. |

FOREIGN PATENT DOCUMENTS

| DE | 10 2016 211 397 A1 | 12/2017 |
| EP | 2 778 256 A1 | 9/2014 |
| FR | 3 050 671 A1 | 11/2017 |

OTHER PUBLICATIONS

International Search Report mailed Jul. 25, 2022, issued in corresponding International Application No. PCT/FR2022/050876, filed May 9, 2022, 7 pages.
(Continued)

*Primary Examiner* — Christopher J. Besler
(74) *Attorney, Agent, or Firm* — CHRISTENSEN O'CONNOR JOHNSON KINDNESS PLLC

(57) ABSTRACT

Equipment for treating an annular component of an aircraft turbomachine includes a support of elongate shape along an axis. The support includes, at one of its ends, a mount configured to receive the component, which is intended to extend about the axis. A cover is configured to be mounted on the component and to cover an upstream end of this component. The cover includes an orifice oriented along the axis (X). A clamping member passes through the orifice and
(Continued)

is configured to cooperate with the support and to fix the cover to the support. An annular masking gasket extends about the axis and is configured to be interposed between the mount and a downstream end of the component. The gasket has an annular groove configured to be a counter-form of the downstream end.

14 Claims, 13 Drawing Sheets

(51) Int. Cl.
*B24C 1/04* (2006.01)
*C23C 4/01* (2016.01)
*C23C 4/134* (2016.01)

(52) U.S. Cl.
CPC ........ *C23C 4/134* (2016.01); *F05D 2220/323* (2013.01); *F05D 2230/72* (2013.01); *F05D 2230/80* (2013.01); *F05D 2240/90* (2013.01)

(56) References Cited

OTHER PUBLICATIONS

Written Opinion mailed Jul. 25, 2022, issued in corresponding International Application No. PCT/FR2022/050876, filed May 9, 2022, 6 pages.

\* cited by examiner

EQUIPMENT FOR TREATING AN AIRCRAFT TURBOMACHINE COMPONENT

FIELD OF THE DISCLOSURE

This disclosure relates to an equipment for treating an aircraft turbomachine component and to the method implemented for such treatment.

BACKGROUND

In an aircraft turbomachine, the various components and elements that make up the turbomachine can suffer wear associated with the operation of the turbomachine. This wear can be caused by friction between one component and another, resulting in a loss of material.

It may be possible to repair a worn component. Repair is the treatment of a worn area or surface to restore it to its original dimensions. The treatment may, for example, be the deposition of a coating by thermal spraying. Such a treatment means that the component to be treated must be partially masked with precision to leave the areas and surfaces to be treated visible.

At present, a worn component is replaced by a new one if it cannot be repaired. This can be explained by the lack of reliable and appropriate repair methods, particularly in the case of components with complex geometries, such as a rolling bearing support, where the coating must be deposited precisely to specific areas as required. Repairs involving the application of a coating are carried out manually by masking the component with adhesive tape. This procedure has a number of disadvantages: it can lead to the coating being deposited on undesired areas as a result of the adhesive tape peeling off during the operation, which contributes to a lack of repeatability and reliability. Moreover, as the technique is manual, the time spent masking the component is significant. It is therefore not suitable for a routine use.

In the prior art, means exist for treating components and are described in particular in US-A1-2007/0361422, DE-A1-102016211397, FR-A1-3050671 or EP-A1-2778256.

In particular, the present disclosure is intended to solve in particular some or all of the above problems.

SUMMARY

The present disclosure proposes an equipment for treating an annular component of an aircraft turbomachine, the equipment being characterised in that it comprises:
- a support having a generally elongate shape along an axis, the support comprising at one of its longitudinal ends a mount configured to receive the component to be treated which is intended to extend around the axis;
- a cover configured to be mounted on the component and to cover at least one upstream end of this component, the cover comprising an orifice oriented along the axis;
- a clamping member passing through the orifice and extending parallel to the axis, the member being configured to cooperate with the support and to attach the cover to the support; and
- an annular masking gasket for masking the component, the gasket extending around the axis and being configured so as to be interposed between the mount and a downstream end of the component, the gasket comprising an annular gorge configured so as to be a counter-form of this downstream end of the component.

In this way, the disclosure ensures an improved repeatability and reproducibility of the treatment in the areas concerned, i.e. those not masked by the gasket. As the gasket used has a pre-established shape adapted to the component to be repaired, the areas to be treated are clearly delimited and are easily reproduced from one component to another thanks to the gasket. In this way, we ensure that we have a quality treatment that meets the defined criteria, is both repeatable and requires little or no retouching afterwards. So, when the treatment envisaged is the deposition of a coating, the quality of the latter is improved, as is its reproducibility from one component to be treated to another.

The disclosure also ensures an improved productivity during repairs to the component. The gasket is reusable and can easily be placed on another component in the same series to mask the areas not requiring treatment. In this way, the repair of the component is made compatible with an industrialization.

The equipment, according to the disclosure, may comprise one or more of the characteristics below, taken alone with each other or in combination with each other:
- the gasket comprises a chamfer at its external periphery and at a free end, in particular upstream;
- the chamfer extends continuously through 360° around the axis;
- the gasket comprises notches which extend radially with respect to the axis, at the free end of the gasket, and from the internal periphery to the external periphery of the gasket, the chamfer being interrupted by the notches;
- each of the notches is delimited by a frustoconical surface portion extending from the internal periphery to the external periphery of the gasket;
- the gorge comprises an internal cylindrical surface extending around the axis and configured to cover an external cylindrical surface of the downstream end of the component;
- the gorge comprises a frustoconical surface facing the aforementioned internal cylindrical surface and configured to cover an internal frustoconical surface of the downstream end of the component;
- the gasket is made of a silicone-based material and preferably has a hardness of between 60 and 65 Shore A;
- the support comprises legs extending along the axis from the mount to a base configured to rest on a work surface;
- the support comprises a clamping column aligned on the axis and extending from the base or the work surface to the mount, this column comprising a free end configured to cooperate by screwing with the clamping member which is also aligned on the axis;
- the clamping member is configured to cooperate with the clamping column by screwing.

The present disclosure also relates to an assembly comprising an equipment as described above and an annular component of an aircraft turbomachine, this component comprising:
- a downstream end engaged in the gorge of the masking gasket,
- an upstream end covered by the cover, and
- at least one surface located between the downstream and upstream ends, which is left free and intended to undergo a treatment from the outside.

The assembly, according to the disclosure, may comprise one or more of the characteristics below, taken alone with each other or in combination with each other:

the component is a support ring for supporting a rolling bearing;

the gorge covers 90% or 99% of a height or longitudinal dimension of an external cylindrical surface of the downstream end of the component, measured from a lower edge of the component.

The disclosure also proposes a method for treating an annular component of an aircraft turbomachine, by means of an equipment as described above, the method comprising the following steps:
a) positioning the component so that its longitudinal axis is aligned with the axis of the equipment and engaging the downstream end of the component in the gorge of the masking gasket;
b) mounting the cover on the component so that the cover covers the upstream end of the component;
c) engaging the clamping member through the orifice in the cover and attaching the cover to the support; and
d) treating at least one surface not covered by the cover and the gasket, by a treatment chosen from the sandblasting and the thermal spraying.

DESCRIPTION OF THE DRAWINGS

The disclosure will be better understood and other details, characteristics and advantages of the present disclosure will become clearer from the following description made by way of non-limiting example and with reference to the attached drawings, in which:

FIG. 2A is a view along the sectional axis I-I and FIG. 2B is a view along the sectional axis II-II;

DETAILED DESCRIPTION

Figure 11:
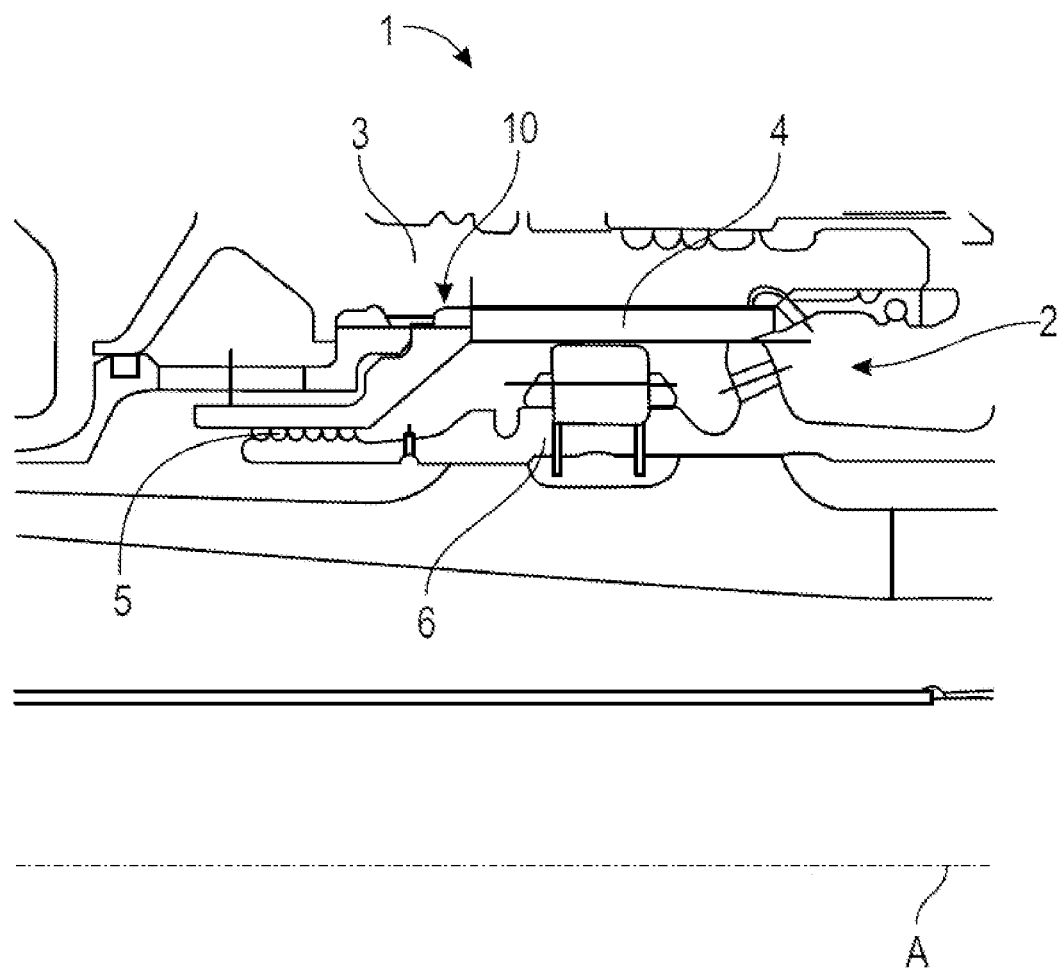
FIG. 11 is a partial cross-sectional view of a turbomachine.

FIG. 11 shows a portion of a turbomachine 1, known in the prior art, extending along an axis of revolution A. In this example, the turbomachine 1 comprises an annular component 10 located upstream or in front of a rolling bearing 2. An external periphery of the component 10 is attached to an external annular component 3 which forms a stator and carries an external ring 4 of the bearing 2. An internal periphery of the component 10 forms a labyrinth gasket 5 with annular licks carried by a rotor in which the internal ring 6 of the bearing 2 is integrated. The bearings here are roller bearings.

In the following, reference is made to the annular component 10 of the turbomachine 1 which is, for example, a rolling bearing support or forms part of such a support. The component 10 is shown in detail in FIGS. 1 and 2. Such a component 10, known in the prior art, extends around an axis Y and comprises an upstream end 11 and a downstream end 13. The upstream end 11 comprises a cylindrical surface for supporting a rolling bearing ring. The downstream end 13 comprises an external periphery from which at least one first external cylindrical surface portion 13a and at least one second external cylindrical surface portion 13b can be distinguished.

The external periphery of the downstream end 13 may comprise four first cylindrical surface portions 13a. Each of these portions 13a has a first dimension, corresponding to a length of arc of circle, which may have an angular extent a, referred to a plane perpendicular to the axis Y, of between 5 and 45° (degrees). The external periphery of the downstream end 13 may also comprise four second cylindrical surface portions 13b. Each of these portions 13b has a second dimension, corresponding to a length of arc of circle, which may have an angular extent 3, referred to a plane perpendicular to the axis Y, of between 5 and 45° (degrees). A first surface portion 13a is comprised between two second surface portions 13b, and a second surface portion 13b is comprised between two first surface portions 13a.

The first external cylindrical surface portion 13a is located on a first circumference having a diameter substantially greater than the diameter of a second circumference on which the second external cylindrical surface portion 13b is located.

Figure 1:
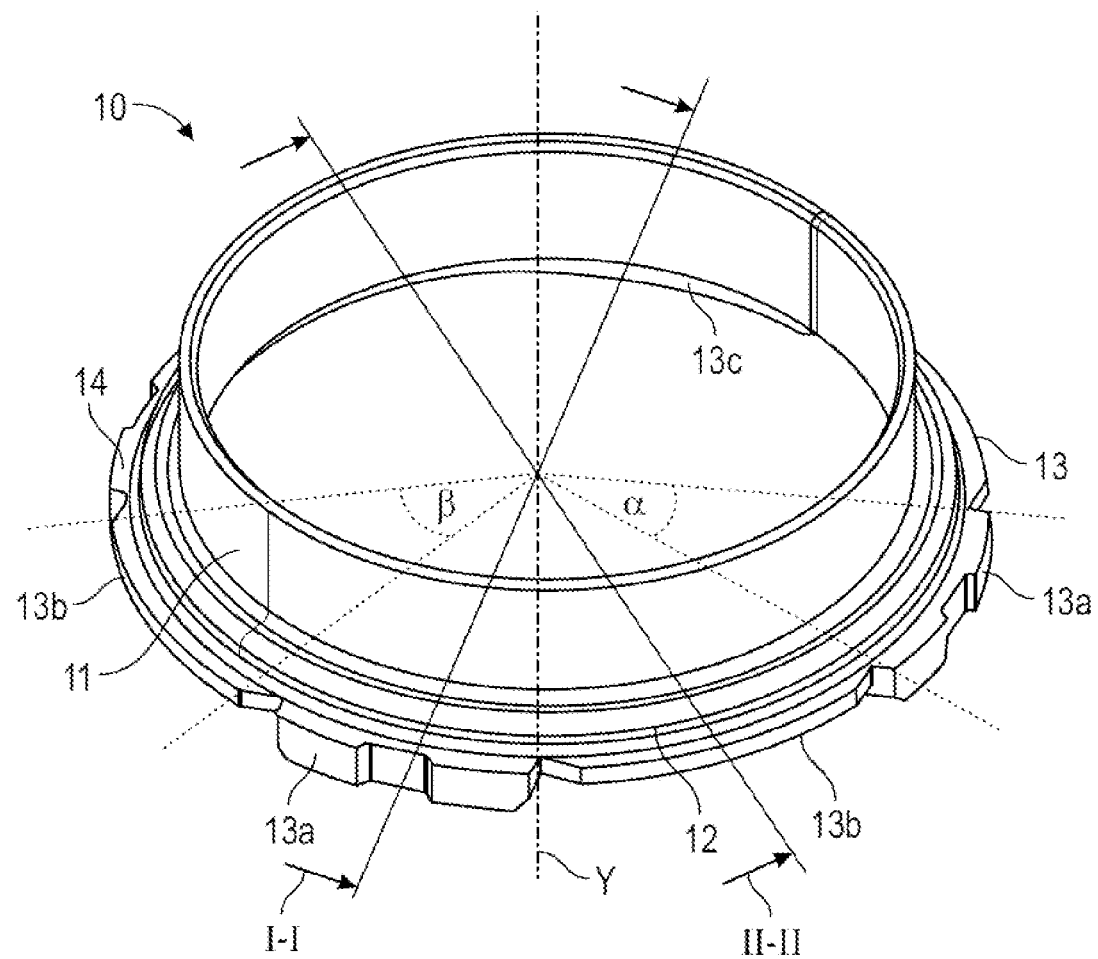
FIG. 1 is a schematic view of a turbomachine component, in particular a rolling bearing support such as exists in the prior art.
Figure 2A:
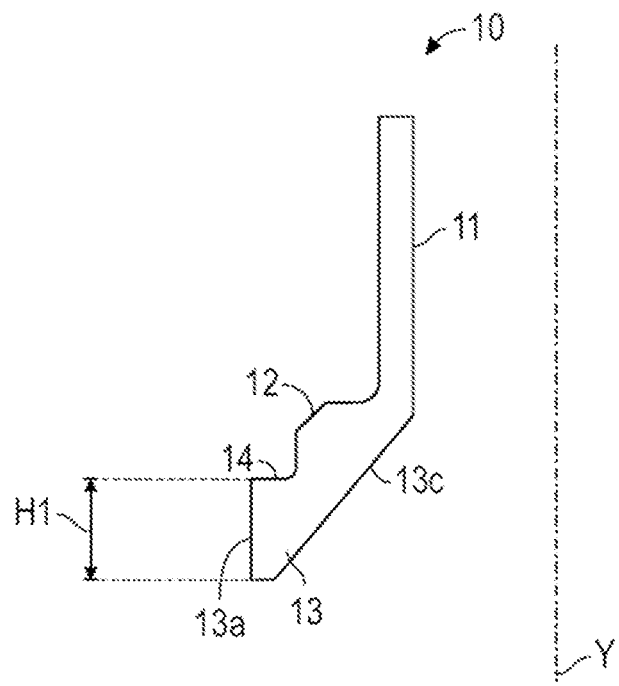
FIGS. 2A and 2B are schematic half-sectional views of the turbomachine component of FIG. 1 along different sectional axes.
Figure 2B:
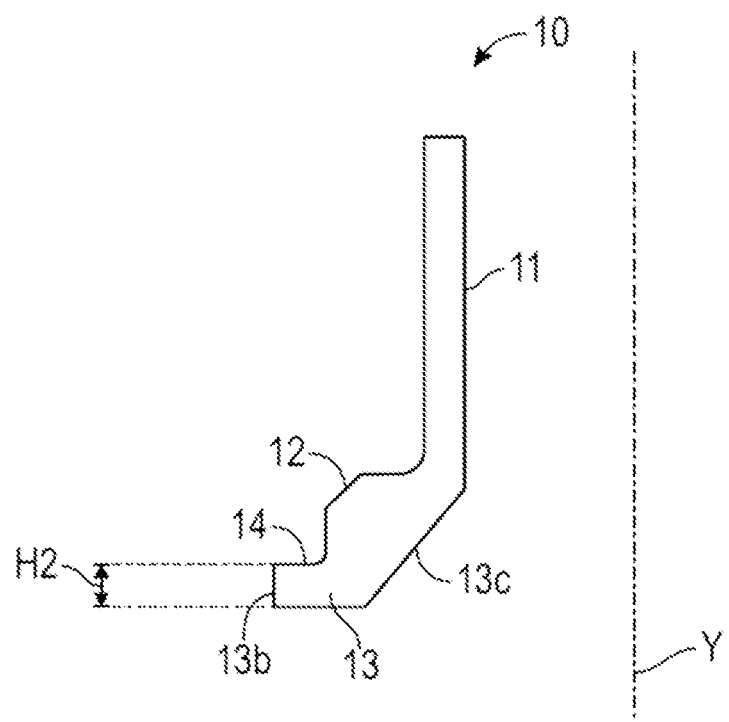

FIGS. 2A and 2B show the component 10 of FIG. 1 along a cutting axis I-I and a sectional axis II-II respectively. It is understood that the first external cylindrical surface portion 13a has a first axial dimension H1 substantially greater than a second axial dimension H2 of the second external cylindrical surface portion 13b. The end 13 may also comprise an internal frustoconical surface 13c at its internal periphery.

The component 10 also comprises one or two annular surfaces 12, 14 located between the two ends 11, 13. The annular surface 14 extends perpendicular to the external cylindrical surface portions 13a, 13b and forms an annular lower edge. The annular surface 12 connects the annular rim to the upstream end 11 of the component 10, this surface 12 can have a generally frustoconical shape.

The second external cylindrical surface 13b and/or the surfaces 12 and 14 are areas that are likely to be subject to friction during the operation of the turbomachine, which can lead to wear of the aforementioned areas. Also, the second external cylindrical surface portion 13b and/or the surfaces 12 and 14 are areas that we are seeking to treat, for example by depositing a coating.

Figure 3:
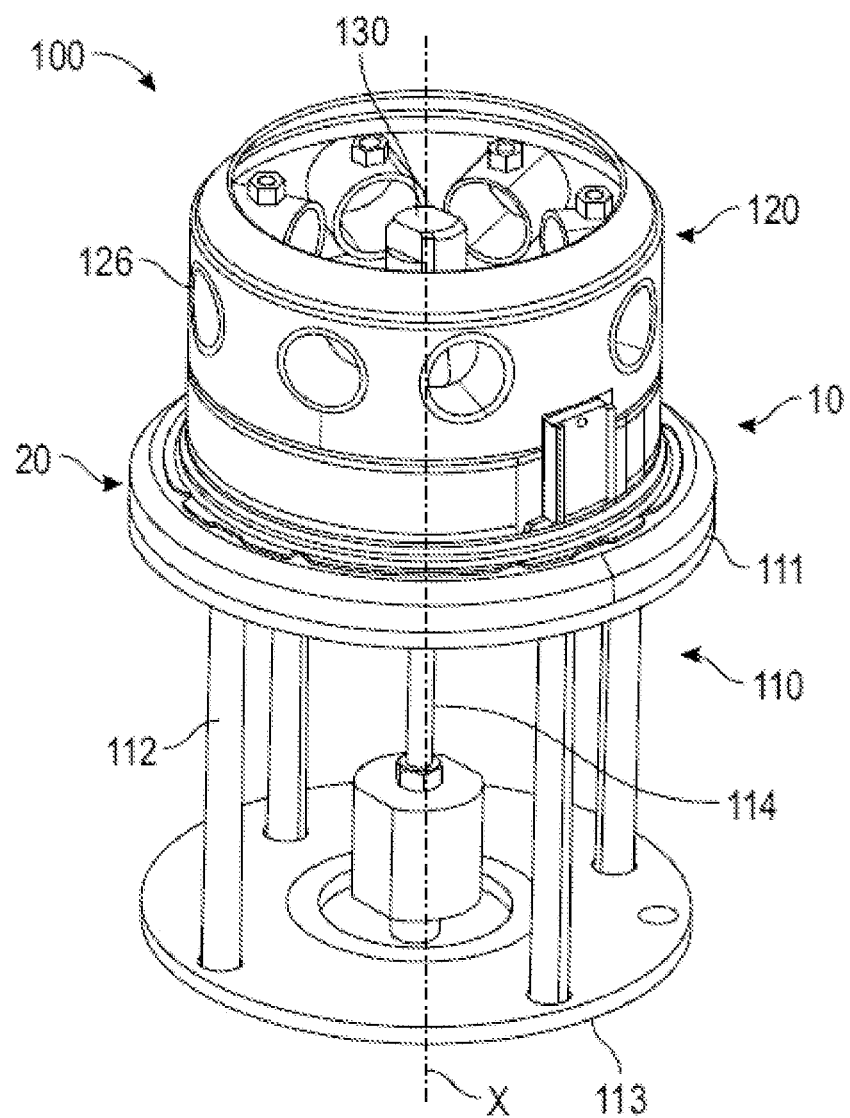
FIG. 3 is a schematic perspective view of an equipment for treating a turbomachine component according to the disclosure.
Figure 4:
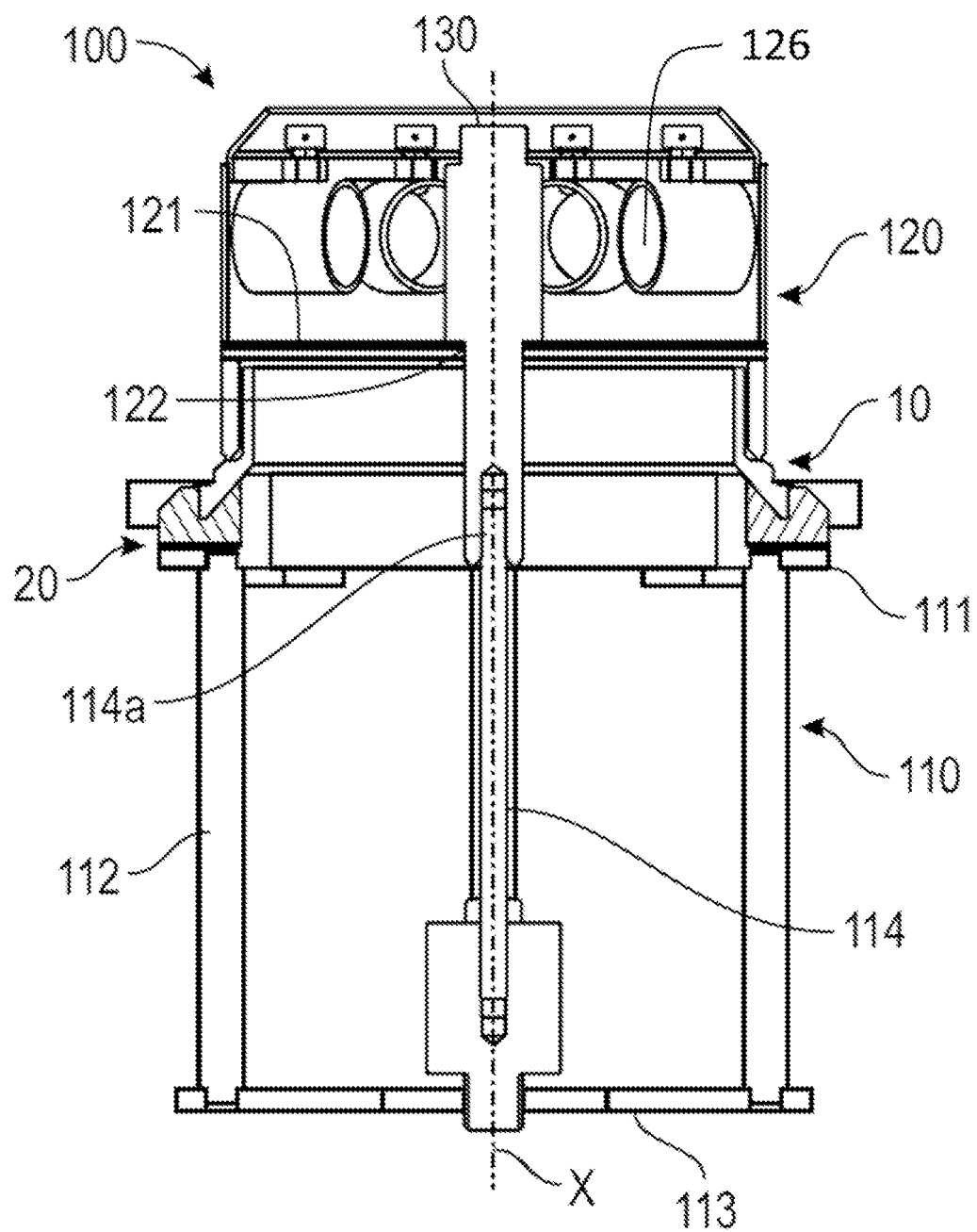
FIG. 4 is a schematic cross-sectional view of the equipment shown in FIG. 3.
Figure 5:
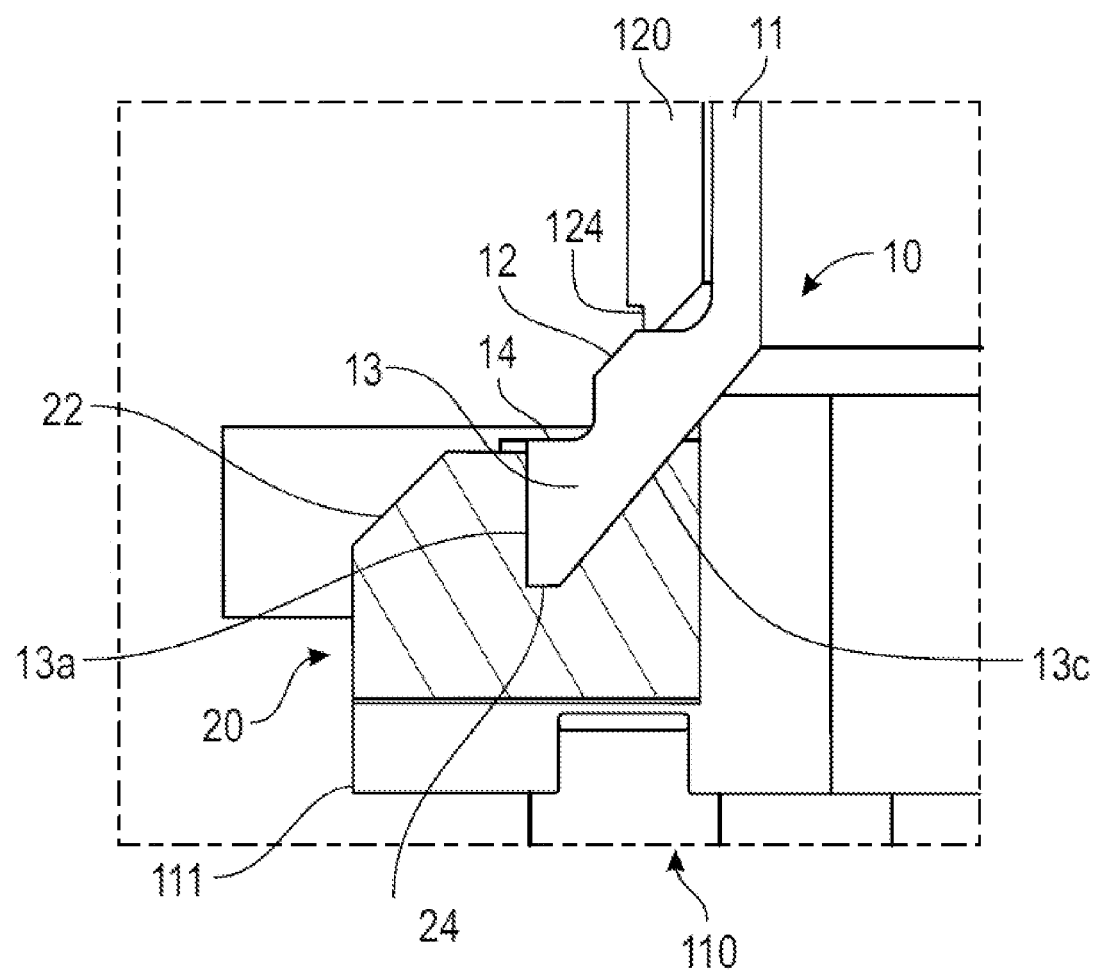
FIG. 5 is a detailed schematic view of a portion of FIG. 4.

FIGS. 3 to 9 illustrate an equipment 100 for treating an annular component 10 of an aircraft turbomachine. In particular, FIGS. 3 to 5 show the equipment 100 comprising a support 110, a cover 120, a clamping member 130 and an annular masking gasket 20 for masking the component 10.

The support 110 has a generally elongated shape along an axis X. In the example shown, this axis X is substantially vertical. At one of its longitudinal ends, the support 110 comprises a mount 111 designed to receive the component 10 to be treated. In other words, the component 10 is intended to extend around the axis X so that the axis Y of the component 10 coincides with the axis X. The support 110 may comprise legs 112 which extend along the axis X, from the mount 111 to a base 113 configured to rest on a work surface. Among other things, the base 113 allows the support 110 to be centered on the work surface. The support 110 may also comprise a clamping column 114 aligned with the axis X which extends from the base 113 or the work surface to the mount 111. This column 114 comprises an upper end 114a configured to cooperate by screwing with the clamping member 130.

The cover 120 is configured to be mounted on the component 10 and to cover at least partly the upper end 11 of the component 10. The cover 120 comprises an orifice 122, this orifice 122 being able to be pierced in a wall 121 perpendicular to the axis X. The cover 120 may comprise an annular shoulder 124 at its end intended to be in contact with the component 10. During the treatment of the component 10, and in particular when depositing a coating, this shoulder 124 allows a degressive deposit to be made by the shading effect, limiting the risk of chipping. The cover 120 may also comprise one or more lateral openings 126 or may not have any. These openings 126, where present, can be used to position devices allowing for testing or checking the coating once it has been produced.

The clamping member 130 passes through the orifice 122 and extends parallel to the axis X. The member 130 is configured to cooperate with the support 110 and is configured to attach the cover 120 to the support 110. The clamping member 130 can also be configured to cooperate by screwing, when present, with the clamping column 114 of the support 110 and in particular with the free end 114a. It is understood that in such a case, the member 130 is aligned with the axis X, as is the orifice 122.

Figure 6:
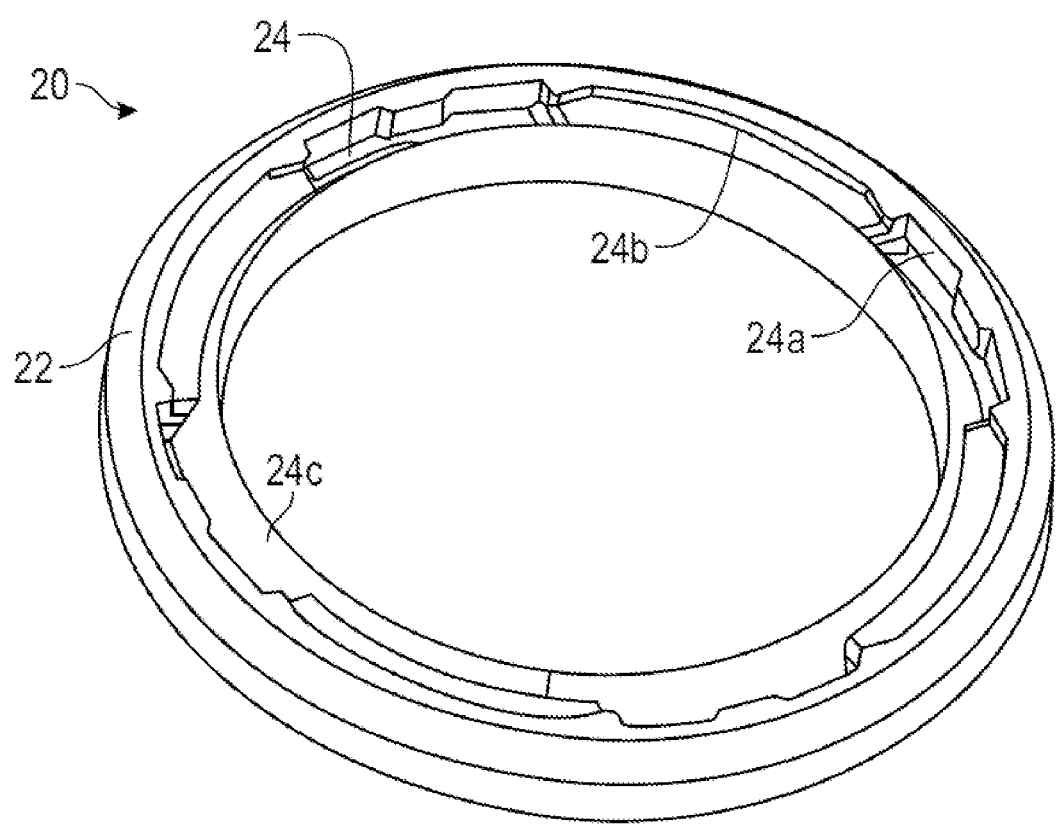
FIG. 6 is a schematic view of a masking gasket according to one form of the disclosure.
Figure 8:
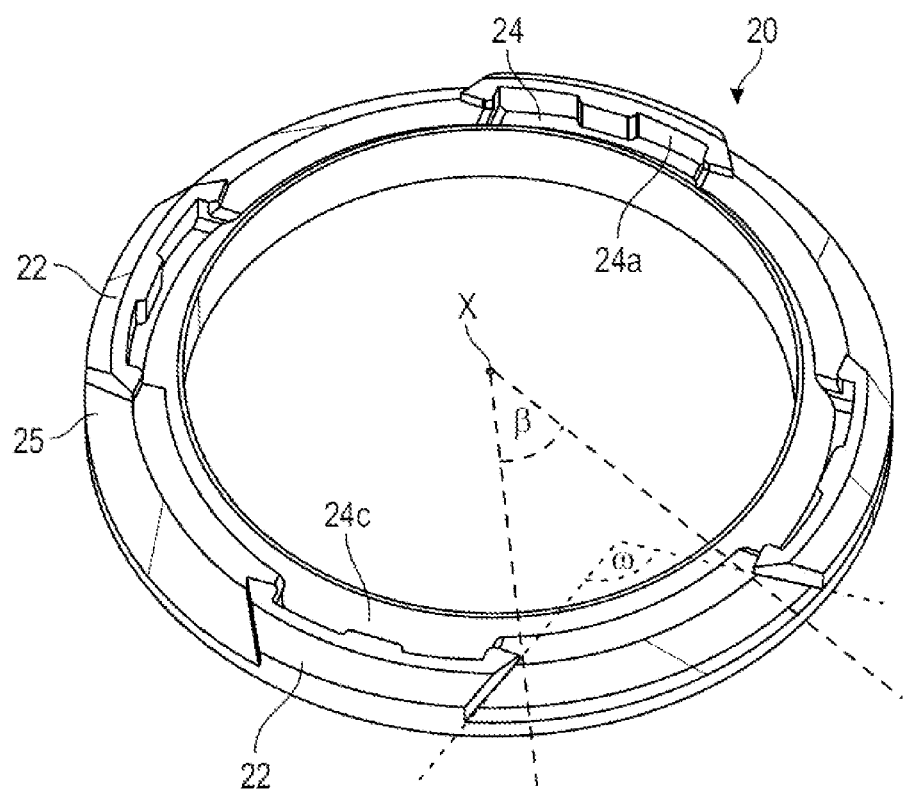
FIG. 8 is a schematic view of the masking gasket according to another form of the disclosure having a chamfer with radial notches.

The annular masking gasket 20 is designed to at least partially mask the annular component 10. The gasket 20 extends around the axis X and is configured to be interposed between the mount 111 of the support and the downstream end 13 of the component 10. As can be seen in FIGS. 6 and 8, the gasket 20 comprises an annular gorge 24 configured to be a counter-form of this downstream end 13 of the component 10. The gorge 24 comprises an internal cylindrical surface 24a extending around the axis X and configured to cover the first external cylindrical surface portion 13a of the downstream end 13 of the component 10. The gorge 24 also comprises a frustoconical surface 24c facing the internal cylindrical surface 24a. This frustoconical surface 24c is configured to cover an internal frustoconical surface 13c of the downstream end 13 of the component 10.

Figure 7:
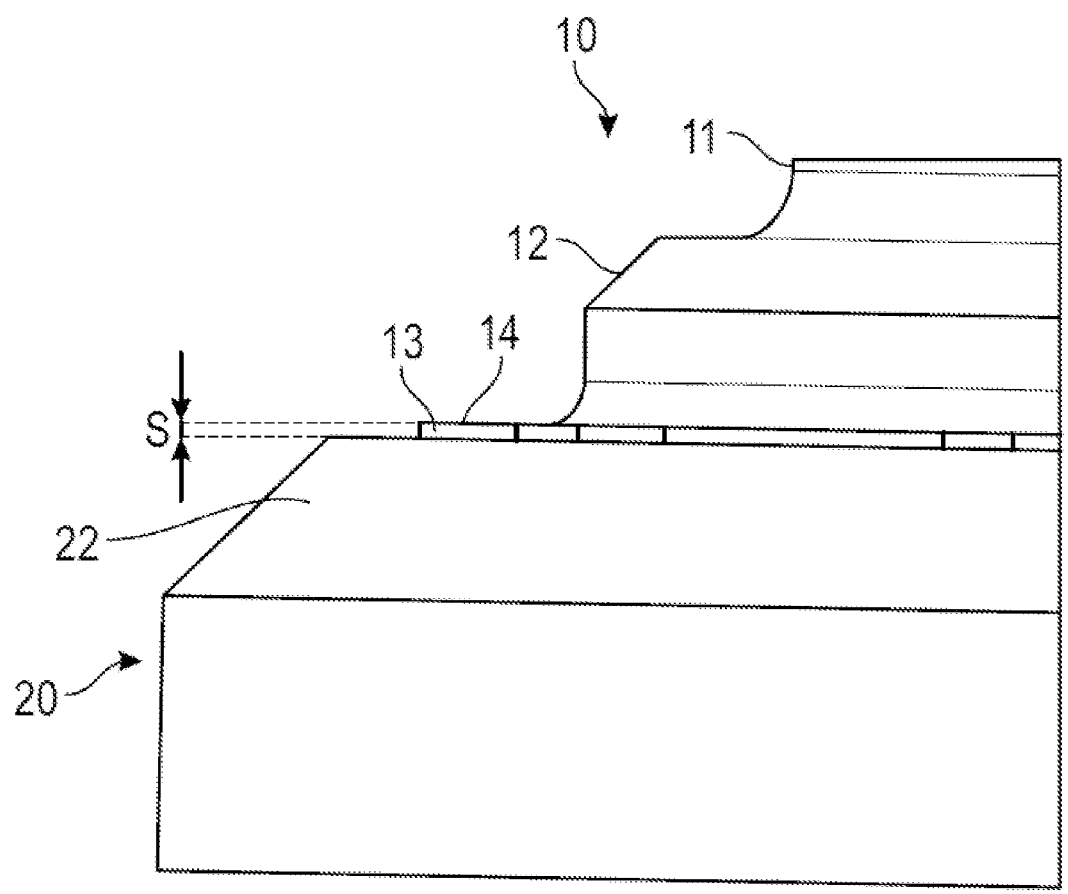
FIG. 7 is a schematic view of an assembly comprising the turbomachine component of FIG. 1 inserted in the gasket of FIG. 6.

FIGS. 6 and 7 illustrate a gasket 20 according to a first embodiment. In this example, the gasket 20 comprises a chamfer 22 at its external periphery and at one free end, in particular upstream. The chamfer 22 may extend continuously through 360° about the axis X. It is understood that the gorge 24 also comprises an internal cylindrical surface 24b configured to cover the second external cylindrical surface portion 13b of the component 10.

FIG. 7 shows the assembly formed by the component 10 and the gasket 20. When the downstream end 13 of the component 10 is inserted into the gorge 24 of the gasket 20, the first external cylindrical surface 13a and the second external cylindrical surface 13b are at least partially masked by the internal cylindrical surface 24a of the gorge 24. It is understood that the gasket 20 is mounted so as to fit with the component 10, and in particular with the first and second external cylindrical surface portions 13a, 13b. The gorge 24 can thus cover 90 or 99% of the height or longitudinal dimension of an external cylindrical surface portion 13a, 13b of the downstream end 13 of the component 10, measured from a lower edge of the component 10. It is understood that a step of dimension S is left free on the external cylindrical surface 13a, 13b. The value of the step of dimension S can be between 0.1 and 1 mm (millimeter). The dimension S is preferably equal to 0.6 mm. As the first and second external cylindrical surface portions 13a, 13b have different longitudinal dimensions, it is understood that the counter-form of the gorge 24 has different depths adapted to the portion 13a, 13b that it covers.

In addition, the upstream end 11 of the component 10 is also masked, i.e. covered, by the cover 120.

In this way, the surface 12, the surface 14 of the lower edge and the height S of the external cylindrical surface 13a, 13b are at least left visible. It is understood that these surfaces left free are intended to be treated from the outside.

The gasket 20 described above has at least the advantage of improving the quality of the deposit on the areas to be treated. Thanks to its inclination, the chamfer 22 allows the particles of material sent onto the component 10 to bounce back towards the outside of the equipment 100 and not towards the areas to be treated. In this way, the deposit on the areas to be treated is uniform.

Another advantage is the step of dimension S, which allows an optimum sandblasting of the surfaces to be treated. It also prevents the deposited coating from chipping when the component 10 is extracted from the gasket 20.

Figure 9:
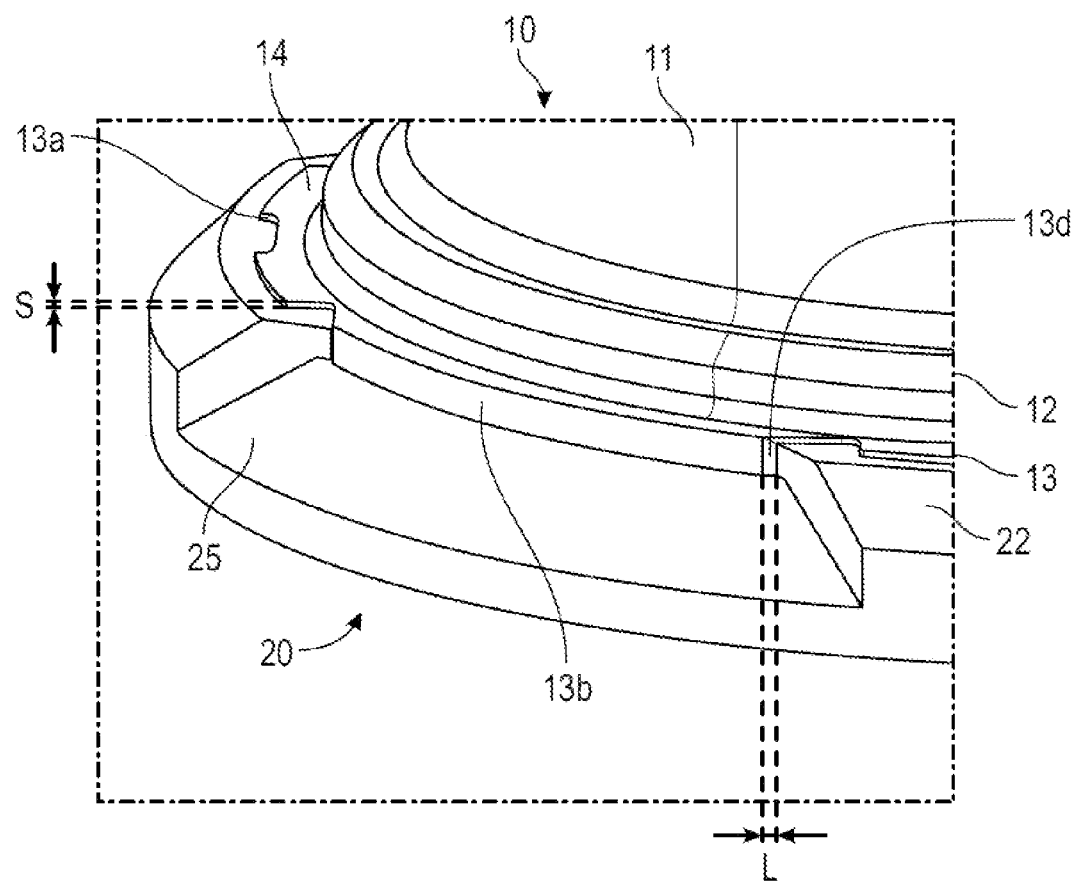
FIG. 9 is a schematic view of an assembly comprising the turbomachine component of FIG. 1 inserted in the gasket of FIG. 8.

Reference is now made to FIGS. 8 and 9, which illustrate another embodiment for the gasket 20. In this example, the gasket 20 comprises notches 25 which extend radially with respect to the axis X, at the free end of the gasket 20, and from the internal periphery to the external periphery of the gasket 20. In this way, the chamfer 22 extending around the external periphery of the gasket 20 is interrupted by the notches 25. In addition, each of the notches 25 is delimited by a frustoconical surface portion which extends from the internal periphery to the external periphery of the gasket 20, thus forming an angle ω, greater than the angle β. The chamfer 22 and the notches 25 offer the same advantages as mentioned above.

When the downstream end 13 of the component 10 is inserted into the gorge 24 of the gasket 20, only the first external cylindrical surface portion 13a is at least partially masked by the internal cylindrical surface 24a of the gorge 24. The gorge 24 can therefore cover 90 or 99% of the height or longitudinal dimension of the external cylindrical surface 13a. It is understood that a step of dimension S, similar to that described above, is left free on the first external cylindrical surface 13a. The internal cylindrical surface 24b is absent, in other words the second portion of the external cylindrical surface 13b of the component 10 is left free.

As in the example in FIG. 7, the cover 120 covers the upstream end 11 of the component 10. The surface 12, the surface 14 of the lower edge, the step of dimension S of the external cylindrical surface 13a, 13b and the second external cylindrical surface 13b are at least left visible. It is understood that these surfaces left free are intended to be treated from the outside.

Each notch 25 is configured to be aligned with a free surface 13b, as seen in the example in FIG. 9, so that the second dimension of the second external cylindrical surface portion 13b, in other words the length of the arc of circle formed by this portion 13b, is substantially equal to or substantially less than the dimension of the notch 25 at the level of the internal periphery of the gasket 20. It is understood that there are as many notches 25 as there are second surface portions 13b.

A connecting portion 13d of dimension L between the first external cylindrical surface portion 13a and the second external cylindrical surface portion 13b can also be left partly free at the level of the notch 25. The dimension L may, for example, be between 0.1 and 1.5 mm (millimeters). The dimension L is preferably equal to 1 mm. The portion 13d of dimension L creates an offset with the gasket 20, making it easier to extract the component 10 without chipping the deposit.

In the embodiments shown, the gasket 20 can be made of a silicone-based material and preferably has a hardness of between 60 and 65 Shore A, which allows the gasket 20 to have a sufficient resistance to the treatment temperature. The gasket 20 is able to deform, particularly under the pressure exerted by the cover 120 on the component 10.

Figure 10A:
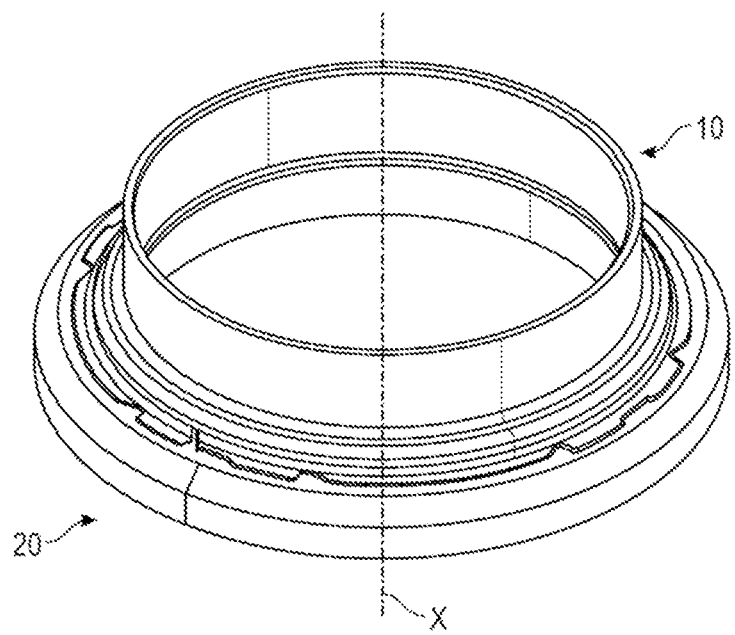
FIGS. 10A and 10B are schematic views of the equipment shown in FIG. 3 and illustrate the treatment method using such equipment.
Figure 10B:
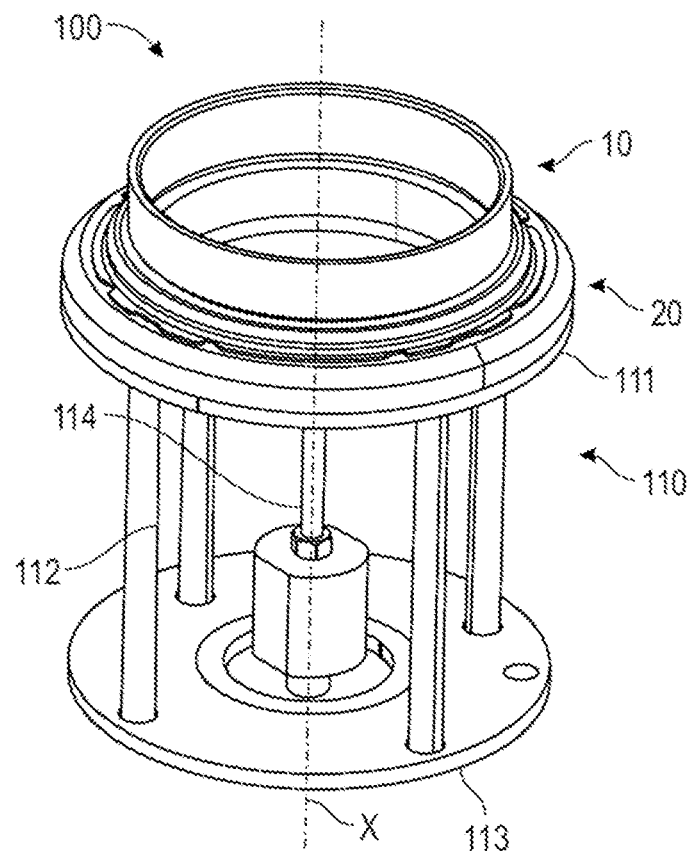
Figure 10C:
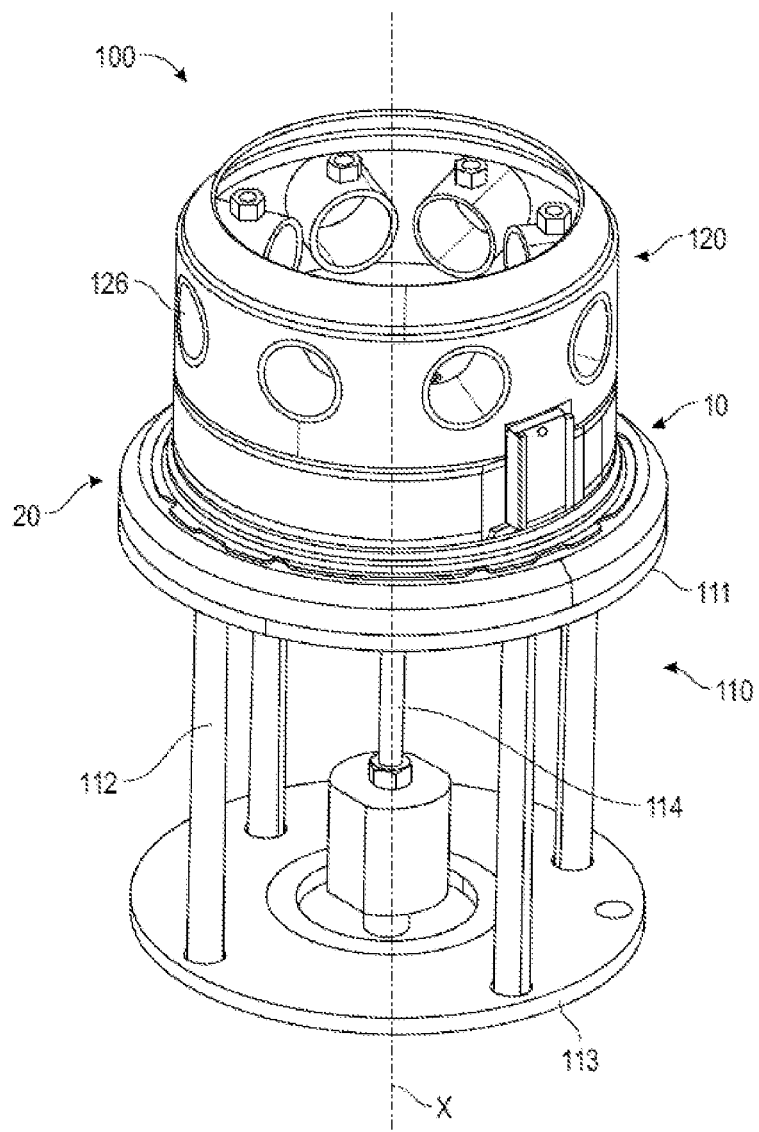
FIG. 10C is another schematic view of the equipment shown in FIG. 3 and illustrates the treatment method using this equipment.
Figure 10D:
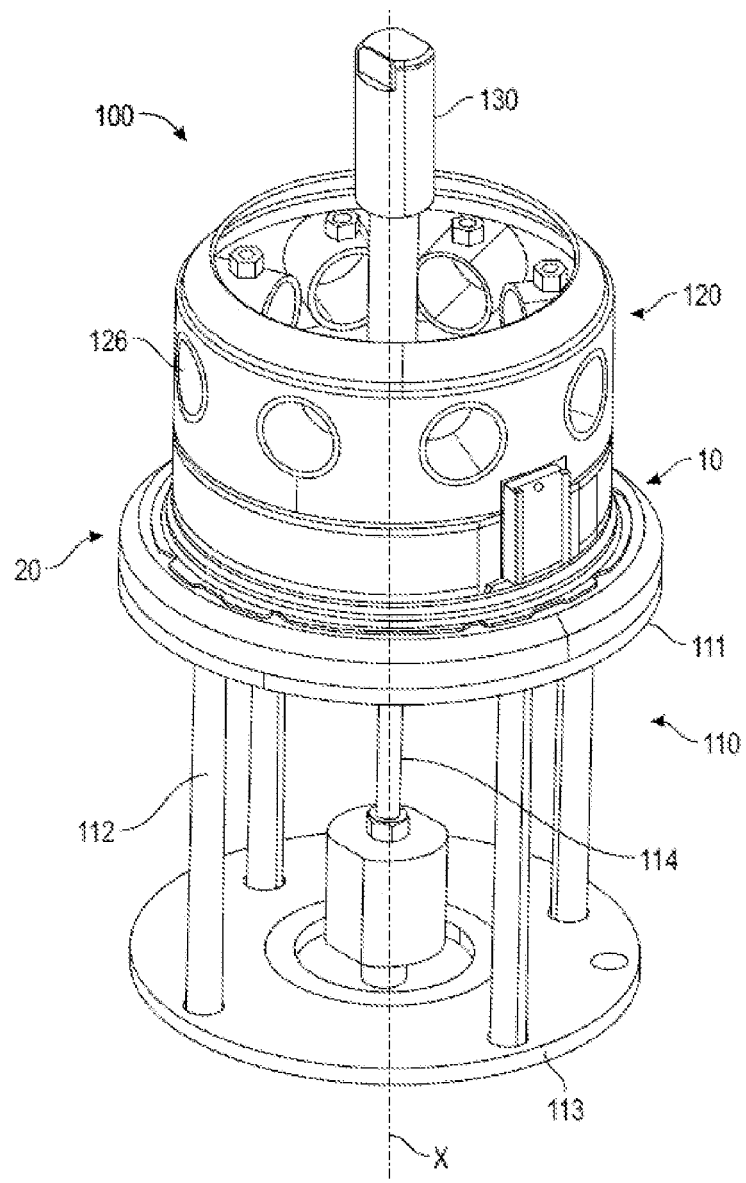
FIG. 10D is a further schematic view of the equipment of FIG. 3 and illustrates the treatment method using that equipment.

The applicant has also developed a method for treating an annular component 10 of an aircraft turbomachine, using an equipment 100 as described above. This method comprises the following steps, illustrated in FIGS. 10A to 10D:
  a) positioning the component 10 so that its longitudinal axis Y is aligned with the axis X of the equipment 100 and engaging the downstream end 13 of the component 10 in the gorge 24 of the masking gasket 20, as shown in FIGS. 10A and 10B;
  b) mounting the cover 120 on the component so that the cover covers the upstream end 11 of the component, as shown in FIG. 10C;
  c) engaging the clamping member 130 through the orifice 122 in the cover 120 and attaching the cover 120 to the support 110, as shown in FIG. 10D; and
  d) treating at least one surface 12, 13b, 14 not covered by the cover and the gasket 20, by a treatment selected from the sandblasting and the thermal spraying of material by plasma.

During the treatment step d), the surfaces left free by the masking gasket 20 and the cover 120 can be treated. The treatment is generally a plasma-assisted metalization, which involves projecting molten metallic particles onto the desired areas. The configuration of the gasket 20 means that the areas to be treated can be precisely defined, while ensuring a uniform and homogeneous coating. The chamfer 22 and the notches 25, when present, allow the metallic particles to bounce back towards the outside of the equipment. This avoids excess thicknesses, for example, which would require subsequent retouching.

The disclosure as described above has the advantage of being a single equipment, which allows to save time during the component masking phase while ensuring a repeatability and a reproducibility of the results, irrespective of the shape of the gasket used. A further advantage lies in the shape and the material of the gasket, which allows to avoid non-conformities during the treatment, thus avoiding an additional rework step.

The invention claimed is:

1. An equipment for treating an annular component of an aircraft turbomachine with a treating medium, the equipment comprising:
  a support having an elongate shape along an axis (X), said support comprising, at a longitudinal end of the support, a mount configured to receive the annular component to be treated which extends around said axis;
  a cover configured to be mounted on said annular component and to cover at least one upstream end of this annular component, said cover comprising a wall with an orifice extending therethrough along the axis (X);
  a clamp passing through said orifice and extending parallel to said axis (X), said clamp comprising a first elongate element engaging the wall of the cover and having a first threaded portion extending along said axis (X), and a second elongate element coupled to the support and having a second threaded portion configured to engage the first threaded portion so that rotation of the first threaded portion relative to the second elongate element selectively provides a clamping force that removably attaches the cover to said support; and
  an annular masking gasket configured to mask said annular component, said annular masking gasket extending around the axis (X) and being configured so as to be interposed between the mount and a downstream end of the annular component such that said annular masking gasket contacts both said mount and said downstream end of the annular component when the annular component is mounted to the equipment, said annular masking gasket comprising an annular gorge configured so as to be a counter-form of the downstream end of said annular component,
  wherein said cover combined with said annular masking gasket define a treating area for the annular component, so that only said treating area is configured to be in contact with the treating medium.

2. The equipment according to claim 1, wherein the annular masking gasket comprises a chamfer at an external periphery and at a free end.

3. The equipment according to claim 2, wherein the chamfer extends continuously through 360° about the axis (X).

4. The equipment according to claim 2, wherein the annular masking gasket comprises notches which extend radially with respect to said axis (X), at the free end of said annular masking gasket, and from an internal periphery to the external periphery of said annular masking gasket, the chamfer being interrupted by said notches.

5. The equipment according to claim 4, wherein each of the notches is delimited by a frustoconical surface portion which extends from the internal periphery to the external periphery of the annular masking gasket.

6. The equipment according to claim 1, wherein the annular masking gasket is made of a silicone-based material.

7. The equipment according to claim 1, wherein the support comprises legs which extend along the axis (X) from the mount to a base configured to rest on a work surface.

8. The equipment according to claim 1, wherein the annular gorge comprises an internal cylindrical surface extending around the axis (X) and configured to cover an external cylindrical surface of the downstream end of the annular component.

9. The equipment according to claim 8, wherein the annular gorge comprises a frustoconical surface facing the internal cylindrical surface and configured to cover an internal frustoconical surface of the downstream end of the annular component.

10. An assembly comprising an equipment according to claim 1 and an annular component of an aircraft turbomachine, the annular component comprising:
  a downstream end engaged in the annular gorge of the annular masking gasket of the equipment,
  an upstream end covered by the cover of the equipment, and at least one surface located between the downstream and upstream ends, which is left free and configured to undergo a treatment from outside the assembly.

11. The assembly according to claim 10, wherein the annular component of the equipment is a support ring for a rolling bearing.

12. The assembly according to claim 10, wherein the annular gorge covers 90 or 99% of a height or longitudinal dimension of an external cylindrical surface of the downstream end of the annular component, measured from a lower edge of said annular component.

13. A method for treating an annular component of an aircraft turbomachine, by means of an equipment according to claim 1, said method comprising the following steps:
   a) positioning the annular component so that its longitudinal axis is aligned with the axis (X) of the equipment and engaging the downstream end of the annular component in the gorge of the annular masking gasket of the equipment;
   b) mounting the cover of the equipment on the annular component so that the cover covers the upstream end of the annular component;
   c) engaging the clamp of the equipment through the orifice in the cover and attaching the cover to the support of the equipment; and
   d) treating at least one surface not covered by the cover and the annular masking gasket, by a treatment selected from sandblasting and thermal spraying.

14. The equipment according to claim 6, wherein the annular masking gasket has a hardness of between 60 and 65 Shore A.

* * * * *